United States Patent [19]

Sann et al.

[11] 4,094,368

[45] June 13, 1978

[54] LOAD CELL OVERLOAD PROTECTION SYSTEM FOR WEIGHING SCALES

[75] Inventors: Robert I. Sann, Englewood Cliffs; Arthur Goldberg, Fort Lee, both of N.J.

[73] Assignee: Howe Richardson Scale Company, Clifton, N.J.

[21] Appl. No.: 654,752

[22] Filed: Feb. 3, 1976

[51] Int. Cl.² ............................................ G01G 21/10
[52] U.S. Cl. .................................... 177/128; 177/187
[58] Field of Search ............... 177/184, 185, 186, 187, 177/188, 189, 255, 256, 257, 210 R, 260, 128

[56] References Cited

U.S. PATENT DOCUMENTS

| | | | |
|---|---|---|---|
| 1,654,648 | 1/1928 | Hem | 177/187 |
| 2,742,278 | 4/1956 | Carleton | 177/189 |
| 3,338,324 | 8/1967 | Burke et al. | 177/257 |
| 3,561,553 | 2/1971 | Blubaugh | 177/255 X |
| 3,831,687 | 8/1974 | Maffia et al. | 177/257 X |

Primary Examiner—Joseph W. Hartary
Attorney, Agent, or Firm—Norris & Bateman

[57] ABSTRACT

A weighing scale having a load receiving structure, such as a weighing platform, a force-transmitting system, such as a lever system, supporting the load receiving structure, and a load cell and selectively adjustable preload spring assembly connected to the force-transmitting system and supported by a rigid support structure independently of the force-transmitting system, wherein the load cell is rigidly mounted on the rigid support structure, and the preload spring is connected between the load cell and the force-transmitting system.

25 Claims, 6 Drawing Figures

LOAD CELL OVERLOAD PROTECTION SYSTEM FOR WEIGHING SCALES

FIELD OF INVENTION

This invention relates to weighing scales and particularly to a load cell overload protective system for weighing scales.

BACKGROUND

The type of load cell weighing scale with which this invention is concerned typically comprises a load-receiving structure which is operatively connected through a lever system or other force-transmitting system to a load cell to measure the weight of a load on the load-receiving structure. In this type of scale, the load cell is subject to damage by dynamic and/or static overloads.

To avoid such load cell damage, various devices have previously been proposed to protect or isolate the load cell from the overload. Examples of such prior devices are shown in FIG. 1 of the drawings herein and in U.S. Pat. No. 3,561,553 issued on Feb. 9, 1971 to O. J. Blubaugh, U.S. Pat. No. 3,269,472 issued on Aug. 30, 1966 to R. E. Bell, and U.S. Pat. No. 3,502,164 issued on Mar. 24, 1970 to T. Akuta et al.

Some prior load cell overload protection devices, such as the one shown in FIG. 1 of the drawings herein, employ a preloaded spring. Although this type of overload protection device is of generally simplified construction, it is not without its shortcomings.

In the prior load cell overload protection device shown in FIG. 1, the preloaded spring is indicated at A. The load cell protected by spring A is indicated at B and is suspended between a fulcrumed beam C and spring A. Load cell B is connected through a loop and pin type tension joint D, a further spring E and an isolation mass F (i.e. a heavy metal block) to one end of beam C. The other end of load cell B is connected through another loop and pin type tension joint G and a link P to one end of spring A.

The other end of spring A is tied to ground by being seated against a rigid, fixed structural member H which is bolted to or seated on the scale-supporting floor. A load-receiving structure, such as a hopper J, is suspended from beam C which is swingable about a fulcrum K between upper and lower stops L and M. With this construction only tensile forces are applied to load cell B.

Spring A, after assembly with stop plate H and the other scale components is pre-loaded against ground to seat a stop member N, which is secured to link P, against member H. For normal loading the force exerted by spring A is greater than the pull applied to load cell by a load-induced force. Stop member N therefore remains in engagement with member H to provide a stiff joint or connection tying load cell B to ground so that tension developed by a load in hopper J is transmitted through load cell B and directly to ground through the engaging members N and H. Spring E absorbs high frequency shock or drop energy during normal loading.

When an excessive load is applied to hopper J, spring A deflects causing stop N to come off its seat on member H and allowing beam C to swing up to strike stop L. The force exerted by the abnormal load is therefore diverted through stop L and is not applied to load cell B. The spring rate of spring A and the adjustable gap at stop L are such that the load cell capacity is not exceeded as spring A deflects to allow the beam to strike stop L under the influence of excessive loading.

One major disadvantage of the foregoing load cell overload protection arrangement is that spring A must first be assembled with the other scale parts and tied to ground by way of member H before it can be adjusted to the desired preload force. This structural characteristic requires preloading of spring A to be set in the field (i.e. at the site of installation) after the scale is assembled and the preload spring is tied to ground.

Another major shortcoming of the load cell overload protection system shown in FIG. 1 is that the preload force exerted by spring A will change with settlement or yielding of the scale housing, support floor or any other parts on which the structural member H is supported.

SUMMARY AND OBJECTS OF INVENTION

A major object of this invention is to provide a novel load cell overload protection system which overcomes the foregoing shortcomings of the system shown in FIG. 1.

The novel load cell overload protection system of this invention is particularly featured by a self-contained load cell and preload spring module in which the shock absorbing preload spring may selectively be preloaded independently of any scale parts not forming a part of the self-contained module and without requiring assembly of the self-contained module with any other scale parts. Accordingly, the self-contained module of this invention may be adjusted at the factory in advance of installation in a scale and therefore requires no further adjustment after installation.

As compared with the construction shown in FIG. 1, the entire assembly of the load cell, preload spring and related force-transmitting components in the self-contained module of this invention is supported on a rigid support structure completely independently of the force-transmitting means (such as a hopper-supporting fulcrumed beam or a platform-supporting lever system) between the module and load-receiving structure. Accordingly, the complete assembly of the load cell, the preload spring and force-transmitting components in the module is supported independently of any force-transmitting scale components not forming a part of the module.

Additionally, the above-mentioned rigid supporting structure supporting the module's load cell, preload spring and force-transmitting components is advantageously and preferably made a part of the module so that the module of this invention is self-supporting when not assembled with other scale parts. This self-supporting feature facilitates the necessary adjustments in the module without requiring its connection to or support on any other scale parts.

In the preferred embodiment of this invention the preload spring is connected in series between a force input member of the self-contained module and the load cell so that it receives the load-induced force impulse before the impulse is applied to the load cell. This construction, as compared with the system shown in FIG. 1, provides faster response to force impulses to thereby improve the overload protection for the load cell.

In the preferred embodiment of this invention the load cell is mounted on the rigid support structure of the self-contained module and supports the preload spring, and isolation spring and the other force-transmitting components of the module. The isolation spring is connected in series with the preload spring in the module.

The module's rigid support structure is adapted to be detachably mounted on a rigid support surface. For example, in a portable platform scale, the module's rigid support structure may advantageously be detachably mounted on the support base which mounts the platform-supporting lever system in the scale.

Because of the foregoing construction of the self-contained module of this invention, settlement or yielding of the scale support floor, the lever-support base or any other surface on which the module's rigid support structure is mounted is at least partially taken up by the isolation spring and will not significantly vary the preload force exerted by the preload spring. As compared with the overload protection system shown in FIG. 1, therefore, the self-contained module of this invention is less sensitive to yielding or settlement of the support surface.

According to a further feature of this invention, the self-contained load cell and preload module includes an adjustable mechanical stop for diverting excessively large incoming forces directly to ground to bypass the load cell, the preload spring and other components in the module. This feature protects the load cell and other components in the self-contained module from damage by extreme overloads.

As compared with the elongated arrangement of components shown in FIG. 1, the self-contained module of this invention is short and compact. It therefore is readily adaptable to relatively small platform scales and bench scales whereas the prior system of FIG. 1 is not.

For platform scales having a hollow upstanding column or pillar mounting a weight-indicating device, the self-contained module, because of its compactness, may advantageously be mounted within the hollow column to afford efficient utilization of space.

The preload spring and mechanical stop in the self-contained module of this invention are particularly adapted to isolate the load cell from low frequency forces of large amplitude. To afford additional protection for high frequency loads of relatively small amplitude, the overload protection system advantageously includes an additional shock absorber in series with the preload spring. In the illustrated embodiment, this high frequency shock absorber is in the form of an elastically deformable layer of material (such as rubber) disposed between the scale's load-receiving platform and a lever mounted frame on which the platform is supported. This layer of material deforms under the influence of loads to attenuate small amplitude, high frequency shock loads.

As a result of the protection afforded by the overload protection system of this invention, the life and reliability of the load cell or other weight-sensing devices are multiplied many times over when the scale is subject to abnormal operator abuse.

With the foregoing in mind, another major object of this invention is to provide a novel load cell overload protection system which provides improved protection for a load cell or other weight sensing device.

Another major object of this invention is to provide a novel load cell and preload spring module which is self-contained to afford adjustment prior to assembly with the other scale components.

Still another object of this invention is to provide a novel load cell and preload spring module which is self-supporting.

Another object of this invention is to provide a novel load cell and preload spring module which is self-contained and which includes an adjustable mechanical stop for diverting excessively large forces away from the load cell and preload spring.

A further object of this invention is to provide a novel load cell and preload spring module in which a load cell is mounted on a rigid support and in which the preload spring is connected in series between the load cell and a force input member of the module.

A further important object is to provide a novel load cell and preload spring module in which the preload force exerted by the preload spring is not significantly sensitive to yielding or settlement of the surface or structure supporting the module.

Another object of this invention is to provide a novel load cell and preload spring module which is relatively short and compact.

A further important object of this invention is to provide a weighing scale with a novel load cell overload protection system in which a high freqency, low amplitude force shock absorber is connected in series with a low frequency, high amplitude force shock absorber between a load-receiving structure and the load cell.

Further objects of this invention will appear as the description proceeds in connection with the appended claims and below-described drawings.

DETAILED DESCRIPTION

Figures 1, 2:
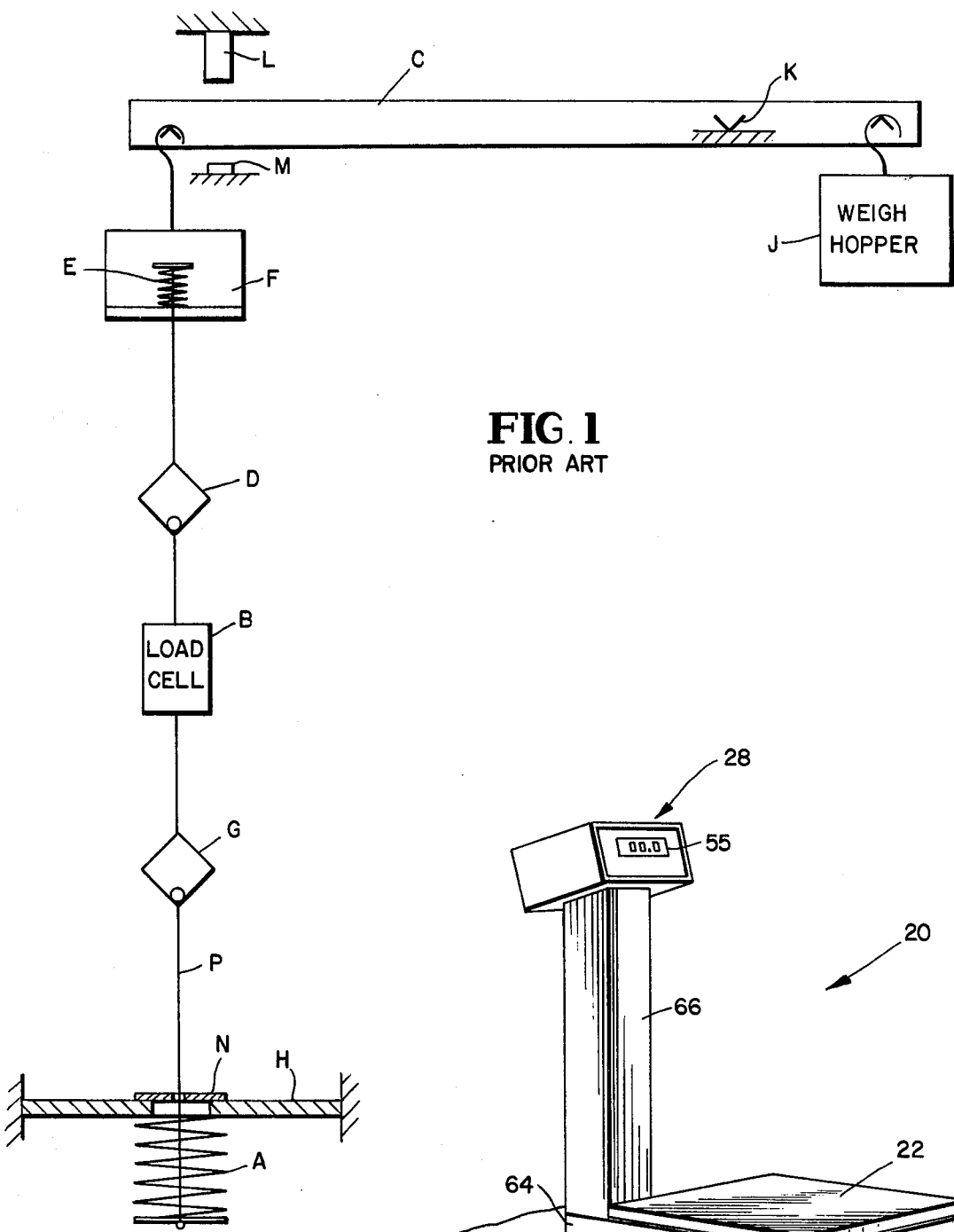
FIG. 1 is a schematic view of a prior art load cell overload protection system for a weighing scale.
FIG. 2 is a perspective view of one embodiment of a weighing scale incorporating the principles of this invention.
Figure 3:
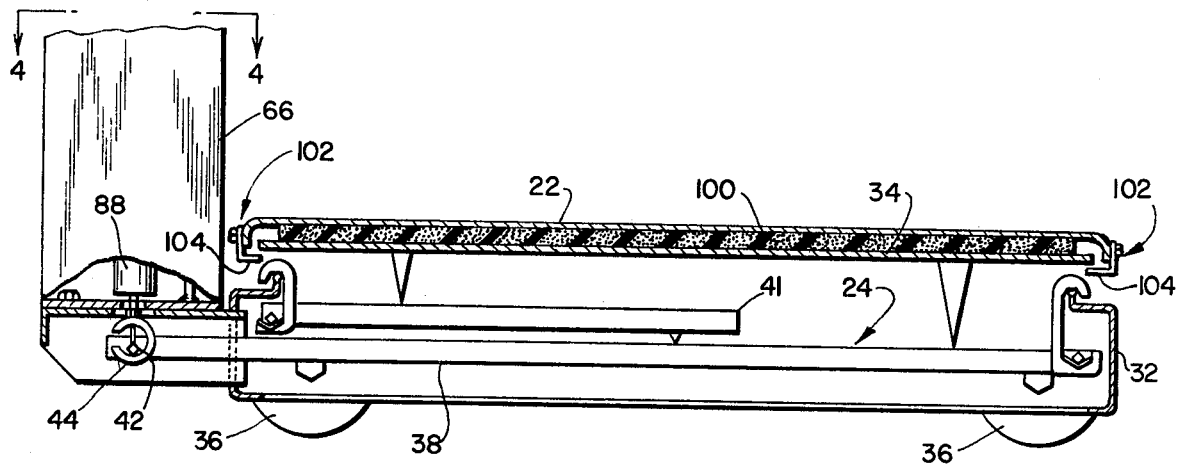
FIG. 3 is a partially schematic side elevation of the weighing scale shown in FIG. 2.
Figure 4:
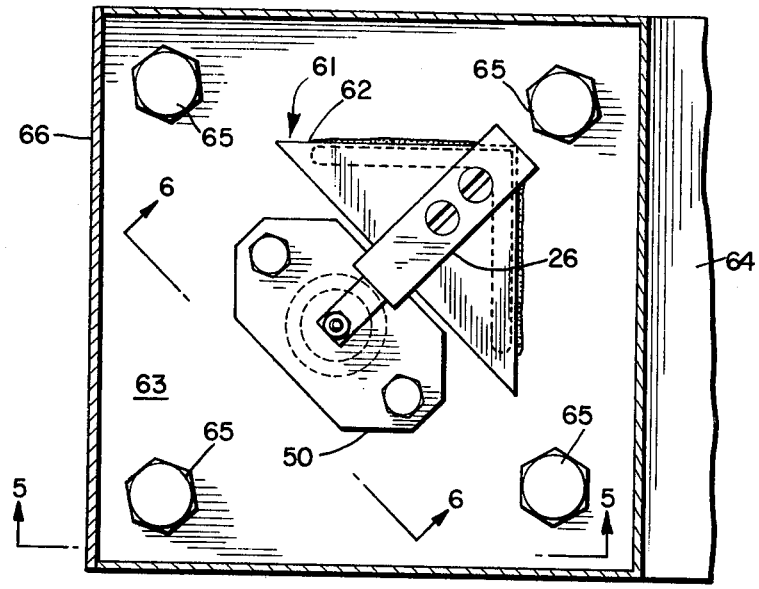
FIG. 4 is a section taken substantially along lines 4—4 of FIG. 3.

Referring to FIGS. 2-6 and particularly to FIGS. 2 and 3, one embodiment incorporating the principles of this invention is in the form of a portable platform scale 20. Scale 20 comprises a load-receiving platform 22, a lever system 24, and a weight indicating device 28. In this embodiment, the self-contained load cell and preload spring module of this invention is indicated at 30. Module 30 comprises, among other things, a load cell 26 and a preload spring 84.

It will be appreciated that module 30 is not limited to the platform scale shown in the drawings and may be employed in any type of scale in which protection of a weight-sensing load cell is desired.

In this embodiment, scale 20 further comprises a support base 32 which is in the form of a rectangular shell. Lever system 24 is hung from base 32 and mounts a frame 34. Platform 22 is mounted on frame 34 and is thus supported by lever system 24.

Platform 22, lever system 24, base 32 and frame 34 are of any suitable construction and may be the same as that described in U.S. Pat. No. 3,338,324 issued on Aug. 29, 1967 to A. J. Burke. As shown, ground-engaging wheels 36 may be rotatably mounted on base 32 for conveniently rolling scale 20 from one place to another.

Lever system 24 comprises a long, pivotally mounted output lever 38 (see FIG. 3) which terminates in a nose iron 40. The remaining force transmitting levers in system 24 are generally indicated at 41.

Figure 5:
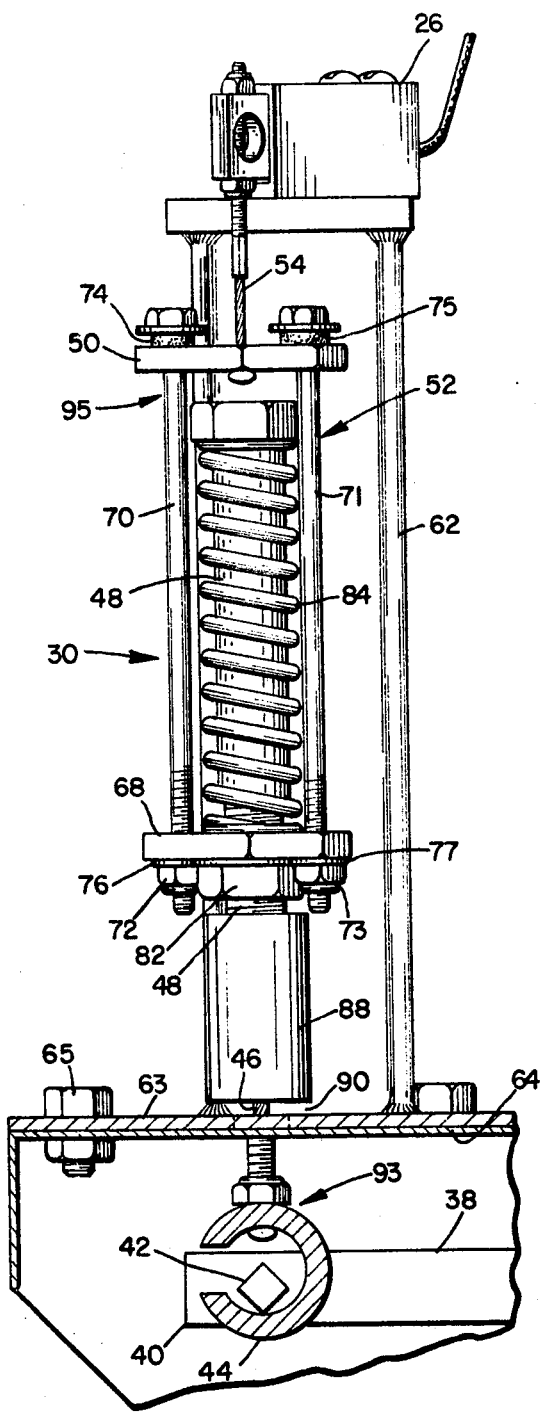
FIG. 5 is a section taken substantially along lines 5—5 of FIG. 4.

As shown in FIGS. 2 and 5, a knife edge pivot 42 is fixed to nose iron 40 and is seated on a hook 44. Hook 44 is suspended by a flexible wire rope 46 from a force-receiving bolt 48. Bolt 48, rope 46 and hook 44 form a part of module 30 in this embodiment.

Module 30 further includes a force-transmitting frame assembly 52 and another flexible wire rope 54. A flat-sided plate or flange 50 forming a part of a frame assembly 52 is suspended by rope 54 from the force input element of load cell 26.

From the scale construction thus far described it will be appreciated that the weight of a load on platform 22 exerts forces on the levers in lever system 24. These load-induced forces are effectively summed at lever 38. The force at lever 38 is therefore a measure of the weight of the applied load and is transmitted as a tensile force by way of wire rope 46 to bolt 48 in module 30.

For normal loading this force is transferred to frame assembly 52 without absorption by spring 84. From frame assembly 52, the load-induced force is transmitted as a tensile force by wire rope 54 to the input of load cell 26.

In response to this load-induced force, load cell 26 develops a d.c. signal voltage which is a function of and varies proportionately with the weight of the load applied to platform 22. Load cell 26 may be of any suitable conventional construction.

The electrical output produced by load cell 26 is applied to the weight indicating device 28. Device 28 may comprise a conventional digital volt meter which is responsive to the weight-indicating signal voltage from load cell 26 to drive a weight display unit 55. Unit 55 provides visual digital read-out of the weight of the applied load. Because of wire ropes 46 and 54, only tensile forces are applied to load cell 26 and other parts in module 30.

According to one aspect of this invention, load cell 26 is tied directly to ground (i.e., the scale support floor indicated at 60 in FIG. 2) by being mounted on a rigid support structure which provides a direct, stiff force-transmitting path to floor 60. In this embodiment, load cell 26 is mounted on a stand 61 of suitable construction. Stand 61 also forms a part of module 30.

As shown, stand 61 comprises a rigid, upright post 62 and a base plate 63. Load cell 26 is positioned on the upper flat end of post 62.

The lower end of post 62 is rigidly fixed to base plate 63 by welding or other suitable means. Base plate 63 is detachably fixed, as by nut and bolt assemblies 65, to a rigid structural extension 64 of base 32. Extension 64 is rigidly fixed to base 32 by any suitable means.

A hollow, vertical pillar or column 66 rigidly mounted on extension 64 extends upwardly above the level of platform 22. Module 30 is advantageously mounted within column 66 to afford efficient utilization of space. Display unit 55 is mounted on the upper end of column 66 as shown in FIG. 2.

In addition to plate 50, frame assembly 52 (see FIGS. 5 and 6) includes a further rigid plate 68 and a pair of bolts 70 and 71, a pair of nuts 72 and 73 and elastically deformable washers 74, 75, 76 and 77. Washers 74-77 may be formed from rubber and cooperate to define a shock-absorbing isolation spring. In place of washers 74-77 other types of springs may be employed as will be described in greater detail later on.

Each of the bolts 70 and 71 extends vertically through aligned apertures in plates 50 and 68 as shown. Plates 50 and 68 are horizontally disposed and are in parallel, vertically spaced apart relation as shown. Bolts 70 and 71 are in parallel, spaced apart relation. Nuts 72 and 73 are respectively threaded on bolts 70 and 71 below plate 68.

As shown, washers 74 and 75 are confined between the top face of plate 50 and the heads of bolts 70 and 71 respectively. Washers 76 and 77 are confined between the bottom face of plate 68 and nuts 72 and 73 respectively. With this frame construction, plates 50 and 68 are positioned between washers 74 and 75 at the upper end of frame assembly 52 and washers 76 and 77 at the lower end of frame assembly 52.

In this embodiment, plate 50 is supported on the lower end of the wire rope 54, bolts 70 and 71 are supported by and depend from plate 50, and plate 68 is supported on the lower ends of bolts 70 and 71 as shown. Thus, the entire frame assembly 52 is suspended by wire rope 54 from load cell 26 which, in turn, is rigidly mounted on post 62.

Figure 6:
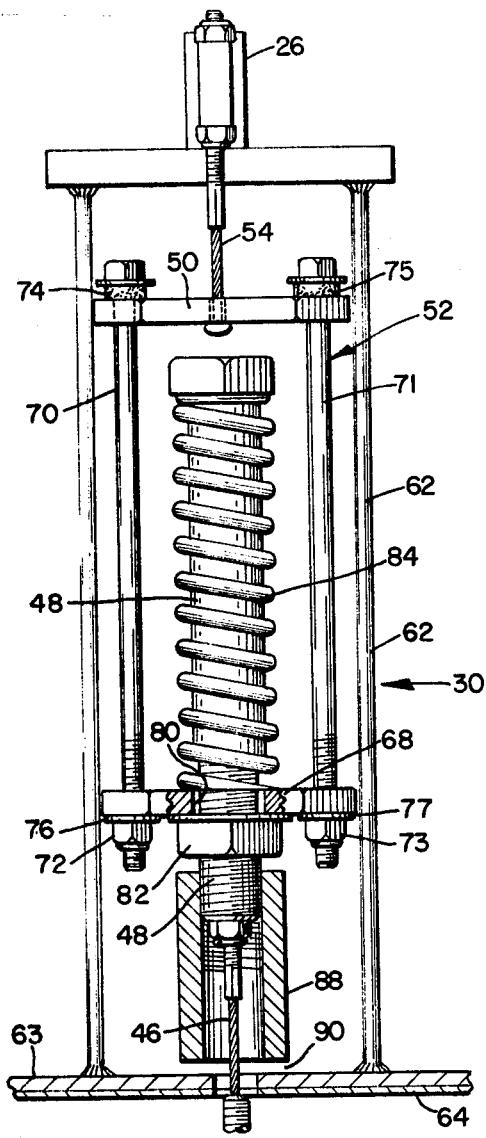
FIG. 6 is a section taken substantially along lines 6—6 of FIG. 4.

As shown in FIGS. 5 and 6, bolt 48 is parallel with and extends centrally between bolts 70 and 71. The head of bolt 48 is spaced a short distance below plate 50, and the lower threaded end portion of the bolt extends freely through and beyond an enlarged central aperture 80 in plate 68. A preload locking nut 82 is threaded on the threaded end portion of bolt 48 below plate 68. For normal loading, nut 82 seats against the flat underside of plate 68 as shown in FIGS. 5 and 6.

Spring 84, which is a helical compression spring in this embodiment, circumferentially surrounds bolt 48 and is confined between the head of bolt 48 and the upwardly facing surface of plate 68. Spring 84 supports bolt 48 on plate 68.

As shown in FIGS. 5 and 6, an adjustable elongated stop nut 88 or other suitable internally threaded tubular member is threaded on the lower end of bolt 48 below nut 82. Nut 88 extends axially below the lower end of bolt 48 and is selectively adjusted prior to operation of the scale to provide a vertical gap (indicated at 90 in FIGS. 5 and 6) of selected distance between the bottom of nut 88 and base 63.

Wire rope 46 is anchored at its upper end to the lower end of bolt 48 and extends downwardly and freely through nut 88 and aligned apertures in base 63 and extension 64. The lower end of rope 44 is secured to hook 44 as previously described. In this embodiment, ropes 46 and 54 are axially aligned, and a vertical plane medially intersecting plates 50 and 68 contains the axes of ropes 46 and 54 and bolt 48, and extends medially between bolts 70 and 71.

From the foregoing description it will be appreciated that module 30 is self-contained and mainly consists of frame assembly 52, bolt 48, preload spring 84, nuts 82 and 88, load cell 26, stand 61 and wire rope 54. In this embodiment, module 30 also includes rope 46 and hook 44 for conveniently applying a force or load to the module prior to assembly of the module with the other parts of scale 20. The complete assembly of load cell 26, frame assembly 52, spring 84, bolt 48, nuts 82 and 88, wire ropes 46 and 54, and hook 44 are supported only by stand 61.

Module 30 is self-contained particularly in the sense that it may be fully pre-assembled as a complete unit and includes all of the parts necessary to preload spring 84 prior to assembly of the module with any of the other components of the scale. This feature of the invention offers a significant advantage because of the practice of shipping platform scales and other types of industrial scales in disassembled or partially disassembled form from the manufacturing plant to a customer or installation site.

With the present invention module 30 may advantageously be assembled and preloaded at the manufacturing plant and shipped as a fully adjusted, pre-assembled unit to the customer for assembly with the other components of the scale. Thus, no preload adjustments are required at the customer's site.

Preloading of spring 84 prior to assembly of module 30 with the other parts of scale 20 is easily, quickly and accurately accomplished by first mounting stand 61 on a bench or other suitable support surface and loosening nut 82 to clear plate 68. A weight weighing an amount which corresponds to a desired preload force is then hung from hook 44 to apply a downward pulling force to bolt 48 is opposition to the bias exerted by spring 84.

Spring 84 is thereby compressed by the applied weight and is thus preloaded to a desired, set force corresponding to the selected value of the applied weight. Nut 82 is then threaded up to seat snugly and tightly against the underside of plate 68 to prevent spring 84 from expanding after the applied weight is removed. The applied weight is then removed, and the compressive preload in spring 84 will be locked in by nut 82.

Preloading spring 84 prior to assembly of module 30 with the other scale parts also offers a significant advantage in case a replacement module is needed for a defective module in a scale at a customer's site. In such a case, the replacement module is assembled and factory adjusted at the manufacturing plant prior to shipment. This eliminates the need in making adjustments in the replacement module at the customer's site.

It also will be appreciated that gap 90 may also be set by selectively adjusting nut 88 prior to assembly of module 30 with any other parts of the scale. Nut 88 provides a mechanical stop as will be explained in greater detail later on.

The force resulting from application of a load to platform 22 and transmitted by lever system 24, exerts a downward pull on hook 44. For normal loading (i.e., forces not exceeding the preload in spring 84) nut 82 remains seated against the underside of plate 68 to provide a stiff joint or connection between bolt 48 and plate 68. The load-induced force is thus transmitted to load cell 26 serially through rope 46, bolt 48, nut 82, frame assembly 52 and the isolation spring formed by washers 74-77 in assembly 52 and rope 54.

When an excessive or abnormal load-induced force is applied to hook 44 and exceeds the preload force in spring 84, the downward pull on bolt 48 displaces bolt 48 axially downwardly relative to frame assembly 52, thus compressing spring 84. Since nut 82 is also displaced with bolt 48, nut 82 moves downwardly and away from plate 68 to open up a gap between nut 82 and frame assembly 52. The force transmitting path originally established through nut 82 for normal loading is therefore disabled.

Now the sole force transmitting path is serially through bolt 48, spring 84, frame assembly 52 and rope 54 to load cell 26. Spring 84 is therefore compressed by the abnormal force to absorb it and thus prevent it from damaging the load cell.

As the gap between nut 82 and plate 68 widens, the gas between nut 88 and base plate 63 becomes smaller. Thus, pre-selected downward displacement of bolt 48 under the influence of the abnormal force closes gap 90 to seat stop nut 88 on the rigid base 63 after nut 82 is moved out of engagement with plate 68. This establishes a stiff connection to divert the abnormal force through base 32 to the scale support floor. This mechanical stop feature safeguards load cell 26 and the other parts in module 30 from damage by extremely large forces.

As compared with the prior construction shown in FIG. 1, module 30 is self-supporting in the sense that none of the components of module 30 depends for support upon any force-transmitting scale part which does not form a part of module 30. Furthermore, and more importantly, the preload in spring 84 and the adjustable stop gap 90 are both selectively adjustable independently of any scale parts not forming a part of module 30 and without requiring assembly of module 30 with any other scale parts. Both adjustments may therefore be made in advance of assembling module 30 with the other scale parts.

Additionally, module 30 is compact and relatively short as compared with the prior construction shown in FIG. 1. Module 30 is readily adaptable to bench scales, whereas the construction of FIG. 1 is not because of its length.

From the description of module 30 it is clear that bolt 48, rope 46 and hook 44 form a first force-transmitting system (which is indicated at 93) and frame assembly 52 and rope 56 form a second force-transmitting system (which is indicated at 95). Vertical compactness of module 30 is achieved by overlapping systems 93 and 95 and by arranging spring 84 between the upper end of system 93 and the lower end of system 95. As shown, the upper end of system 93 lies between the upper and lower ends of system 95. Systems 93 and 95 are therefore partially coextensive with each other.

As compared with the construction shown in FIG. 1, spring 84 is much less sensitive to settlement of the scale support floor 60 or yielding of support base 32 because it is not tied directly to ground and further because it is connected in series with the isolation spring washers 74-77 between bolt 48 and load cell 26. Conical spring metal washers or other types of springs may be employed in place of washers 74-77 to define the isolation spring.

Preload spring 84 is mainly effective to isolate load cell 26 from low frequency forces or shock loads of relatively large amplitude. To assure isolation of the load cell from high frequency shock loads of small amplitudes, an additional shock absorber is provided for in the form of elastically deformable strips of material 100 (see FIG. 3) positioned between platform 22 and frame 34. Strips 100 may be sponge rubber or other suitable material of selected thickness and may be cemented to frame 34.

Strips 100 are deformed by shock loads applied to platform 22 to isolate lever system 24 from high frequency load-induced forces of relatively small amplitudes which are less than the preload force exerted by spring 84. Forces of larger amplitude cause strips 100 to effectively bottom out and to thereby transmit the larger shock loads to the lever system. However, the shock absorber defined by strips 100 is in series with preload spring 84 so that the larger amplitude shock loads passed on by strips 100 will be absorbed by spring 84 and/or the isolation spring defined by washers 74-77.

In this embodiment, spring 84 is preferably positioned ahead of load cell 26 to receive the force impulse before it reaches load cell 26. This affords faster shock-absorbing response to shock loads as compared with an arrangement where the preload spring is connected between the load cell and the rigid support structure. With either arrangement the preload spring is in series with the load cell.

Anti-tipping structural members 102 are fixed to platform 22 as shown in FIG. 3 and have horizontally extending leg portions 104 disposed vertically below marginal edge portions of frame 34. Members 102 are advantageously positioned one adjacent to each corner of platform 22. The leg portions 104 of one or more of the members 102 are abuttable with frame 34 upon application of an off-center load to platform 22 to keep platform 22 from tipping.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent is:

1. In a weighing scale, a load-receiving structure for receiving a load to be weighed, force-transmitting means supporting said load-receiving structure for transmitting a load-induced force resulting from application of a load to said load receiving structure, and a self-contained module comprising a rigid support structure and an assembly supported by said support structure and detachably connected to said force-transmitting means, said assembly comprising a load cell receiving said load-induced force for converting said load-induced force into a weight-indicating signal other than a mechanical force, a preloaded spring in series with said load cell and biased to protect load cell from overload, and means enabling selective preloading of said spring to set a selected preload force in said spring independently of any scale parts not forming a part of said module and without requiring assembly of said module with any other scale parts, said load cell being stationarily and rigidly mounted on said rigid support structure so that it remains stationary relative to said support structure while preloading said spring.

2. The weighing scale defined in claim 1 wherein said force-transmitting means comprises a lever system, said weighing scale further comprising support means adapted to be positioned on a scale support floor and supporting said lever system, and means detachably mounting said rigid support structure on said support means to provide for the removal of said module as a unit upon detaching said support structure from said support means and said assembly from said force-transmitting means.

3. The weighing scale defined in claim 1 wherein said load cell is responsive to said load-induced force to produe an electrical signal which is a function of the weight of a load applied to said load-receiving structure, and wherein said load-receiving structure is a load-receiving platform, said weighing scale further comprising a hollow upstanding pillar mounted on said support means and means mounted on the upper end of said pillar and responsive to said signal for displaying the weight of the applied load, said module being positioned within said pillar.

4. In a weighing scale, a load-receiving structure for receiving a load to be weighed, force-transmitting means supporting said load-receiving structure for transmitting a load-induced force resulting from application of a load to said load-receiving structure, a ground-engaging support structure, and an assembly supported on said support structure independently of said force-transmitting means and connected to said force-transmitting means, said assembly comprising (a) a load cell rigidly and stationarily mounted on said support structure for receiving said load-induced force and for converting the load-induced force into a weight-indicating signal, (b) a selectively adjustable preloaded spring connected in series with said load cell, and (c) an adjustable stop member connected intermediate said spring and said force-transmitting means and positioned to engage a part of said support structure when the load-induced force exceeds a predetermined magnitude to prevent transmission of the load-induced force to said load cell when the load-induced force exceeds said predetermined magnitude.

5. The weighing scale defined in claim 4 wherein said support structure comprises first means supporting said force-transmitting means and second means supporting said assembly and detachably mounted on said first means, and said assembly being detachable from said force-transmitting means.

6. The weighing scale defined in claim 5 wherein said load-receiving structure comprises a load-receiving platform, and wherein said force-transmitting means comprises a lever system supporting said platform.

7. The weighing scale defined in claim 6 comprising an upstanding hollow column mounted on said support structure, and weight indicating means mounted on said column, said load cell producing an electrical signal that varies in accordance with the magnitude of the load-induced force, and said weight indicating means being electrically connected to said load cell to respond to said electrical signal for indicating the weight of a load applied to said platform, said assembly and said second means being mounted within said column.

8. The weighing scale defined in claim 4 wherein said assembly has a force-receiving member detachably connected to said force-transmitting means, and wherein said spring is connected between said load cell and said member.

9. The weighing scale defined in claim 4 wherein said assembly comprises a force-receiving member for receiving said load-induced force, wherein said spring is connected between said member and said load cell and exerts a preloaded force on said member in opposition to said load-induced force.

10. In a weighing scale, a load-receiving structure for receiving a load to be weighed, force-transmitting means supporting said load-receiving structure for transmitting a load-induced force resulting from application of a load to said load-receiving structure, a ground-engaging support structure, an assembly support by said support structure independently of said force-transmitting means and connected to said force-transmitting means, said assembly comprising a load cell rigidly mounted on said support structure for receiving said load-induced force and a selectively adjustable preloaded spring connected in series with said load cell, said assembly further comprising a force-receiving member for receiving said load-induced force, said spring being connected between said member and said load cell and exerting a preload force on said member in opposition to said load-induced force, and said member engaging said spring and being displaceable under the influence of said load-induced force to deflect said spring when said load-induced force exceeds the preload force exerted by said spring, and stop means positioned on said member and normally spaced from a rigid stop surface, said stop means being displaceable with said member to abut said stop surface when said member is displaced a pre-selected distance by said load-induced force.

11. The weighing scale defined in claim 10 wherein said stop surface is on said support structure, and wherein said stop means is selectively displaceably mounted on said member to adjust the spacing between said stop means and said stop surface.

12. In a portable platform weighing scale, a load-receiving platform for receiving a load to be weighed, a force-transmitting lever system supporting said platform, a support base structure supporting said lever system, a hollow, upstanding pillar mounted on said base structure, weight indicating means mounted on the upper end of said pillar, and a load cell and preloading spring module disposed within said hollow pillar and having a rigid support structure detachably mounted on said support base structure and an assembly detachably connected to said lever system and supported by said rigid support structure independently of said lever system, said assembly comprising (a) a load cell for converting said load-induced force into a weight-indicating electrical signal and (b) a preloaded spring connected in series with said load cell to exert a force in opposition to said load-induced force, said weight indicating means being electrically connected to said load cell and responsive to said signal for indicating the weight of a load applied to said platform, said rigid support structure including a portion disposed intermediate the upper and lower ends of said pillar, and said load cell being stationarily and rigidly mounted on said portion.

13. In a weighing scale, a load-receiving platform for receiving a load to be weighed, a load cell, and force-transmitting means for transmitting a load-induced force resulting from application of a load to said platform to said load cell, said force-transmitting means comprising a displaceable lever system supporting platform, a first shock absorber, and a second shock absorber, said second shock absorber, said lever system and said first shock absorber being connected in series between said platform and said load cell, said first shock absorber comprising a preloaded spring connected intermediate said lever system and said load cell for absorbing only those load-induced forces equal to or in excess of a preselected magnitude, said second shock absorber comprising an elastically deformable material of pre-selected thickness arranged between said lever system and said platform, said second shock absorber being effective to absorb forces having magnitudes less than said pre-selected magnitude, and stop means disposed intermediate said spring and said second shock absorber for limiting displacement of said lever system when a load-induced force exceeds the preload force exerted by said spring.

14. A portable platform weighing scale comprising a load receiving platform for receiving a load to be weighed, a force-transmitting lever system supporting said platform, a support base structure supporting said lever system, a hollow, upstanding pillar mounted on said base structure, weight indicating means mounted on the upper end of said pillar, and means disposed within said hollow pillar and comprising (a) a rigid support structure detachably mounted on said support base structure and (b) an assembly detachably connected to said lever system and supported by said rigid support structure independently of said lever system, said assembly comprising a load cell for converting said load-induced force into an electrical signal and a preloaded spring connected series with said load cell to exert a force in opposition to said load-induced force, said weight indicating means being electrically connected to said load cell and being responsive to said signal for indicating the weight of a load applied to said platform.

15. A platform weighing scale comprising a load-receiving platform, a rigid support structure, a force-transmitting lever system mounted on said support structure and supporting said platform, said lever system having a displaceable force output member that is displaced by a load-induced force resulting from the application of a load to said platform, and a load cell and preload spring assembly connected to said output member and having a load cell rigidly mounted on said support structure and connected to receive the load-induced force transmitted by said lever system to produce an electrical signal that varies as a function of the magnitude of the load-induced force, said assembly further including a preloaded spring connected intermediate said load cell and said output member and exerting a preload force in opposition to said load-induced force to protect the load cell against overload, and means for selectively adjusting the preload force exerted by said spring without causing displacement of said output member.

16. The platform weighing scale defined in claim 15 wherein said assembly includes force-transmitting means providing first and second force-transmitting paths between said output member and said load cell, said spring forming a part of said first force-transmitting path, said means for selectively adjusting said preload force having a selectively displaceable member forming a part of said second force-transmitting path, and said spring coacting with said selectively displaceable member to disestablish said second path and to cause the load-induced force to be transmitted to said load cell through said spring by way of said first path upon an increase of the load-induced force to a magnitude exceeding said preload force.

17. The platform weighing scale defined in claim 16 comprising further means for limiting the displacement of said output member upon an increase in the load-induced force to a magnitude exceeding said preload force, said further means having a selectively ajustable part for selectively varying the displacement to which said output member is limited without varying the preload force exerted by said spring.

18. A weighing scale comprising a load-receiving structure for receiving a load to be weighed, a load cell, force-transmitting means intermediate said load-receiving structure and said load cell for transmitting to said load cell a load-induced force resulting from the application of a load to said load-receiving structure to cause the load cell to supply an electrical signal that varies as a function of the magnitude of the load-induced force, a support structure, said force-transmitting means comprising (a) a first force-transmitting assembly supporting said load-receiving structure and mounted on said support structure and, (b) a second force-transmitting assembly connected between said first force-transmitting assembly and said load cell to provide a force-transmitting path between said first force-transmitting assembly and said load cell, said second force-transmitting assembly having a portion that is movable relative to said load cell, a preloaded spring engaging said portion of said second force-transmitting assembly to exert a preload force in opposition to said load-induced force and acting upon said portion to disable said force-transmitting path and to absorb the load-induced force upon an increase in the load-induced force to a magnitude exceeding said preload force, and manually manipulatable means forming a part of said portion for selectively adjusting the magnitude of the preload force exerted by said spring, the assembly of said spring and said second force-transmitting assembly being supported by said load cell, and said load cell being stationarily mounted on said support structure so that it remains stationary upon disabling said force-transmitting path and also upon selectively adjusting said preload force with said manually manipulatable means.

19. The weighing scale defined in claim 18 wherein said load-receiving structure comprises a load-receiving platform, and wherein said first force-transmitting assembly comprises a lever system having a pivotally mounted output lever connected to said second force-transmitting assembly to said load cell.

20. The weighing scale defined in claim 19 wherein said support structure comprises first means mounting said first force-transmitting assembly and second means mounting said load cell, said second force-transmitting assembly being detachably connected to said first force-transmitting assembly and said second means being detachably mounted on said first means to enable the assembly of said second means, said load cell, said second force-transmitting assembly and said spring to be removed as a unit by detachment of said first means from said second means and by detachment of said second force-transmitting assembly from said first force-transmitting assembly.

21. The weighing scale defined in claim 19 wherein said portion comprises a first part, said spring being compressed between said first part and a second part of said second force-transmitting assembly, said manually manipulatable means comprising a manually manipulatable member selectively displaceably mounted on said first part and separably engaging said second part when the load-induced force is less than said preload force to provide a force-transmitting connection in said force-transmitting path that bypasses said spring, and said member being displaceable with said first part when said load-induced force exceeds said preload force to disengage from said second part for effecting the disablement of said force-transmitting path.

22. The weighing scale defined in claim 21 including selectively adjustable stop means for limiting displacement of said first part and said first force-transmitting assembly upon disabling said force-transmitting path, said stop means comprising a further member selectively displaceably mounted on said first part independently of said manually manipulatable member and positioned to engage a portion of said support structure upon displacement of said first part through a distance that is adjustable by selective displacement of said further member along said first part.

23. The weighing scale defined in claim 21 wherein said second part is connected intermediate said load cell and said spring and said first part is connected intermediate said first force-transmitting assembly and spring.

24. A platform weighing scale comprising a lever system, a load-receiving platform supported on said lever system for receiving a load to be weighed, a support structure, said lever system being pivotally mounted on said support structure for transmitting a load-induced force resulting from the application of a load to said platform, a load cell, an assembly supported by said load cell and connected said lever system to provide a force-transmitting path for transmitting the load-induced force from said lever system to said load cell, said load cell supplying an electrical signal that varies as a function of the magnitude of the load-induced force, said assembly including (a) first force transmitting means connected to said load cell, (b) second force transmitting means connected to and movable with said lever system and (c) a preloaded spring for exerting a selectively adjustable preload force on said second force transmitting means in opposition to said load-induced force for biasing a portion of said second force transmitting means into engagement with a part of said first force transmitting means to establish a force-transmitting connection between said first and second force transmitting means when said load-induced force is less that said preload force, said spring being deflectable by said load-induced force when the load induced force exceeds said preload force to separate said portion and said part for disestablishing said force-transmitting connection, said load cell being stationarily mounted on said support structure so that it remains stationary upon disabling said force-transmitting path and upon selective adjustment of said preload force, and mechanical stop means comprising first and second rigid stop members, said first stop member being stationarily positioned on said support structure, said second stop member being adjustably mounted on a part of second force transmitting means for movement therewith and being positioned to engage said first stop member upon displacement of said second force transmitting means through a pre-selected distance to limit the displacement of said second force transmitting means under the influence of said load-induced force.

25. A weighing scale comprising a load-receiving structure for receiving a load to be weighed, a load cell, an assembly providing a force-transmitting path intermediate said load-receiving structure and said load cell for transmitting to said load cell a load-induced force resulting from the application of a load to said load-receiving structure, the load cell being effective to convert said load induced force into an electrical signal that varies as a function of the magnitude of the load-induced force, means forming a part of said assembly and including a preloaded spring for exerting a selectively adjustable preload force in opposition to said load-induced force and for disabling said force-transmitting path upon an increase in the load-induced force to a magnitude exceeding said preload force, means supporting said load cell and said assembly and including a rigid support structure, and said load cell being stationarily mounted on said support structure so that it remains stationary upon disabling said force-transmitting path and upon selective adjustment of said preload force.

* * * * *

UNITED STATES PATENT OFFICE
CERTIFICATE OF CORRECTION

Patent No. 4,094,368　　　　　　　　Dated June 13, 1978

Inventor(s) Robert I. Sann & Arthur Goldberg

It is certified that error appears in the above-identified patent and that said Letters Patent are hereby corrected as shown below:

Column 1, line 7, change "protective" to --protection--

Column 9, line 66, (claim 3), change "produe" to --produce--.

Column 12, line 53, (claim 16), change "of" to --in--.

Column 13, line 32, (claim 19) change "to" to --by--.

Column 14, line 13, (claim 24), after "platform", delete "a" and insert --an electrical--.

Column 14, line 30, change "that" to --than--.

Signed and Sealed this

Twenty-seventh Day of February 1979

[SEAL]

Attest:

RUTH C. MASON
Attesting Officer

DONALD W. BANNER
Commissioner of Patents and Trademarks